United States Patent [19]

Reinmuth et al.

[11] 3,915,900

[45] Oct. 28, 1975

[54] EVAPORATOR MADE FROM SINTERED REFRACTORY MATERIAL

[75] Inventors: Klaus Reinmuth, Durach; Jurgen Schulz, Wallrabenstein, both of Germany

[73] Assignee: Elektroschmelzwerk Kempten GmbH, Munich, Germany

[22] Filed: Aug. 20, 1973

[21] Appl. No.: 389,995

[30] Foreign Application Priority Data

Aug. 18, 1972   Germany............................ 2240655

[52] U.S. Cl................................. 252/520; 252/518
[51] Int. Cl.²............................................ H01B 1/06
[58] Field of Search............................ 252/520, 518

[56] References Cited

UNITED STATES PATENTS

| 3,544,486 | 12/1970 | Passmore...................... 252/518 X |
| 3,582,611 | 6/1971 | Matheson et al................... 219/271 |
| 3,673,118 | 6/1972 | Mandorf, Jr. et al............... 252/520 |
| 3,813,252 | 5/1974 | Lipp.................................... 252/520 |

*Primary Examiner*—Benjamin R. Padgett
*Assistant Examiner*—E. Suzanne Parr
*Attorney, Agent, or Firm*—Francis M. Crawford

[57] ABSTRACT

Vessels suitable for the vacuum evaporation of metals, having improved temperature change stability and reduced electrical resistance decrease are obtained by hot pressing a mixture of an electrically conductive refractory material, such as titanium boride, aluminum nitride, boron nitride and boron oxide.

5 Claims, No Drawings

EVAPORATOR MADE FROM SINTERED REFRACTORY MATERIAL

The present invention relates to improved vessels suitable for the vacuum evaporation of metals comprising 10 – 90 parts by weight of an electrically conductive refractory material, 5 – 30 parts by weight of aluminum nitride, 10 – 40 parts by weight of boron nitride and 2 – 10 percent, by weight of boron oxide, based on the total weight of the other ingredients, and to the process of producing same by hot pressing said mixture at elevated temperatures and pressures.

In the production of capacitor papers and foils, and the like, the vacuum evaporation of metals becomes necessary. For such purpose it has been customary to use evaporator vessels which are heated to the necessary temperature by the direct passage of electrical current. In such installations it is customary to introduce the metal in the form of wire which is brought to the temperature required for melting and evaporation. The composition of such evaporator vessels is described in published patent application DAS No. 1,289,712. Such evaporating vessels, however, have not generally been satisfactory for a number of reasons.

It has now been found in accordance with the present invention greatly improved evaporator vessels are obtained from sintered refractory material, which contain an electrically conductive refractory material, aluminum nitride, boron nitride and 2 – 10 percent, by weight of boron oxide, based on the total weight of the other ingredients. The mixture may also contain aluminum boride and/or silicon nitride.

It has been found expedient to use in the above mixture, instead of the above boron oxide addition, a boron nitride powder which contains 5 – 25 percent, by weight of boron oxide.

Evaporators made in accordance with the present invention no longer contain boron oxide in soluble form and hence have an excellent temperature stability. Furthermore, the specific electrical resistance of such evaporators decreases only slightly over a relatively long period of evaporation use.

By roentgenography it has been possible to prove that in the hot pressing of the above mixture the aluminum nitride reacts with the boron oxide with at least partial exchange of nitrogen and oxygen. There is also then produced, depending upon the sintering conditions, in addition to boron nitride and aluminum oxide, additional mixed oxides and oxinitride phases. While pure aluminum oxide is not stable to molten aluminum in a high vacuum at 1500°C, the corrosion resistance of the evaporator vessels produced in accordance with the present invention is materially improved.

When boron nitride powder, produced from boron oxide and ammonia, was used in the starting material and heated to incandescence at a temperature of 1300° – 1500°C in a nitrogen atmosphere the useful life of the evaporator was considerably increased.

The following examples are given to further illustrate the invention. It should be understood, however, that the invention is not limited to the specific conditions shown therein.

EXAMPLE 1

A mixture of 60 percent, by weight, of titanium boride ($TiB_2$), 15 percent, by weight, of boron nitride, 20 percent, by weight, of aluminum nitride and 5 percent, by weight, of boron oxide, was mixed dry and sintered in a graphite mold at a pressure of 150 kg/cm$^2$ and at a temperature of 2100°C. From the sintered mass was cut an evaporator vessel having the dimensions 10 x 20 x 100 mm. with which it was possible in 20 hours with hourly interruptions to evaporate 4.8 kg of aluminum. The specific electrical resistance at evaporation temperature fell during the process from 3.7 to 2.0m Ohm.cm. At equal evaporation rate evaporators made of the same materials but without the boron oxide, could be operated for only 5 hours.

EXAMPLE 2

In the tests reported in the following Table the term "Useful Life" refers to the time after which evaporators having the dimensions 10 × 20 × 100 mm at an evaporation rate of 4.5 g of aluminum per minute were corroded 2 mm deep in the middle or laterally. Further, this useful life was reached when the evaporators could no longer be used because of cracks, flaws, bending or poor wettability, or when the specific electrical resistance had dropped over the entire length of the evaporator at the evaporation temperature by 40 percent measured from initially 4 to 5m Ohm.cm.

The data summarized in the Table hold for evaporators having the composition 50 parts by weight of titanium diboride, 30 parts by weight of boron nitride, 20 parts by weight of aluminum nitride. In this evaporator the types of boron nitride were varied, and are characterized in the Table by the incandescence temperatures, the specific surface and the boron oxide contents. The Incandescence temperatures are the temperatures at which the boron nitride powder is pretreated in the nitrogen current for purification and crystallization.

Table 1

| Test No. | Aluminum nitride Pts by Wt | Boron nitride Incandescence Temp. °C | Surface (m²/g) | $B_2O_3$ % | Evaporator Density % of Theory | Useful Life hrs |
|---|---|---|---|---|---|---|
| 1 | 20 | 1000 | 23. | 12 | 87.4 | 4 |
| 2 | 20 | 1200 | 10 | 13 | 88.3 | 8 |
| 3 | 20 | 1400 | 5.5 | 13 | 88 | >10 |
| 4 | 20 | 1600 | 3.8 | 13 | 87.4 | 3 |
| 5 | 20 | 1400 | 11 | 0.2 | 90.4 | 3 |
| 6 | 20 | 1400 | 12 | 21 | 94 | >10 |
| 7 | 20 | 1400 | 8.5 | 6 | 91.3 | 10 |
| 8 | 20 | 1800 | 6.0 | 0.2 | 88 | 2 |
| 9 | 0 | 1400 | 8.5 | 6 | 90.3 | 5 |
| 10 | 0 | 1400 | 6.0 | 0.2 | 75 | 1 |

The types of boron nitride used in tests 1 - 5 are from the same raw material charge and were incandesced at different temperatures. The boron nitride incandesced at 1400°C gave the best evaporators. When the boron nitride used was washed free of $B_2O_3$ the useful life of the evaporator fell off sharply (test 5).

In test 8 the boron nitride used was also washed free of boron oxide but incandesced at 1800°C. This also gave a poor evaporator.

Tests 6 and 7 show that with the same incandescent treatment of the boron nitride the boron oxide content and the specific surface can vary within wide limits without thereby impairing the evaporator. Test 6 also shows that the sintering compression facilitated by the higher boron oxide content, since the resulting evaporator under the same sintering conditions attained a clearly higher density.

In the sintering of a mixture without appreciable boron oxide content it was necessary in tests 5, 8 and 10 for the concentration to be carried out at a higher temperature in order to achieve the indicated density. There the materials reacted appreciably with the graphite of the mold. The mixtures of tests 3, 6 and 7, having a useful life of 10 hours, can be condensed under different sintering conditions still higher than indicated in the Table, in which case little reaction with the graphite mold occurs.

In tests 9 and 10 the sintering was effected without the presence of aluminum nitride in the mixture. The evaporators thus prepared were unusable.

The evaporators sintered according to the present invention with boron oxide still contain only traces of free boron oxide when immersed in water do not absorb any measurable moisture. Wet-compressed evaporators can be fully charged for aluminum evaporation immediately after evacuation without harm.

The evaporators of tests 3, 6 and 7 were heated 10 times in less than 60 seconds to evaporating temperature of the order of 1500°C without any damage to the evaporator occurring.

What is claimed is:

1. Evaporators of sintered refractory material, which comprise 10 – 90 parts, by weight, of an electrically conductive refractory material, 5 – 30 parts, by weight, of aluminum nitride, 10 – 40 parts, by weight, of boron nitride and 2 – 10 percent, by weight, of boron oxide, based on the total weight of the other ingredients.

2. Evaporators of sintered refractory material according to claim 1, wherein the composition includes aluminum boride.

3. Evaporators of sintered refractory material according to claim 1, wherein the composition includes silicon nitride.

4. Evaporators of sintered refractory material according to claim 1, wherein boron nitride powder containing 5 – 25 percent, by weight, of boron oxide is substituted for the boron oxide and boron nitride of claim 1.

5. Evaporators of sintered refractory material according to claim 1, wherein the composition comprises titanium diboride, boron nitride, aluminum nitride and boron oxide.

* * * * *